Figure 1:
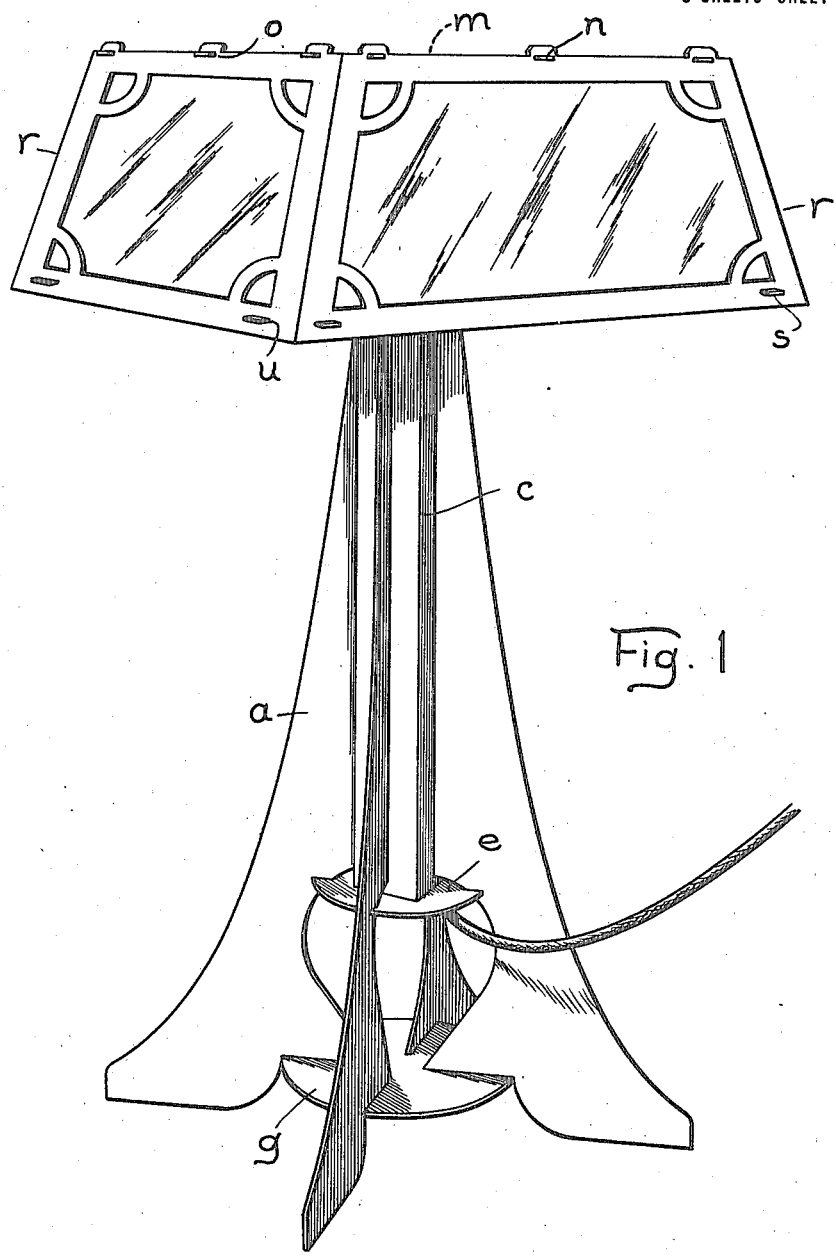

W. P. STEPHENSON.
KNOCKDOWN LAMP STAND AND SHADE.
APPLICATION FILED MAY 8, 1915.

1,157,732.

Patented Oct. 26, 1915.
3 SHEETS—SHEET 1.

INVENTOR
William P. Stephenson
BY
Raymond A. Parker
ATTORNEY

W. P. STEPHENSON.
KNOCKDOWN LAMP STAND AND SHADE.
APPLICATION FILED MAY 8, 1915.
1,157,732.
Patented Oct. 26, 1915.
3 SHEETS—SHEET 2.
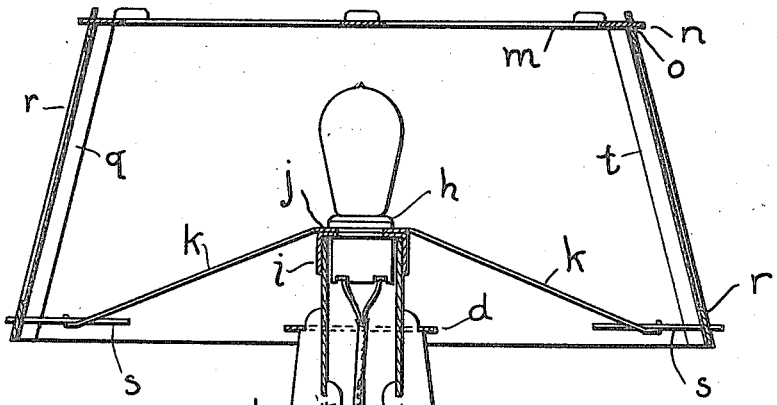
Fig. 2
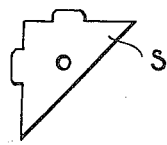
Fig. 11
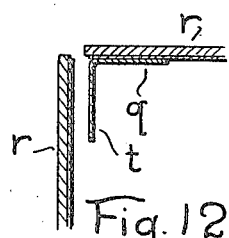
Fig. 12
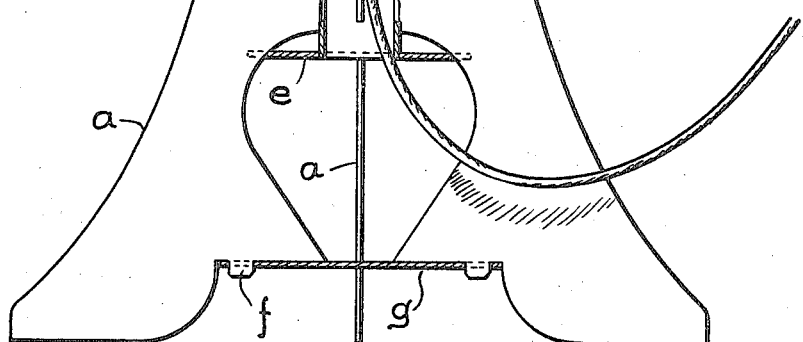
INVENTOR
William P. Stephenson
BY Raymond A. Parker.
ATTORNEY W. P. STEPHENSON.
KNOCKDOWN LAMP STAND AND SHADE.
APPLICATION FILED MAY 8, 1915.
1,157,732.
Patented Oct. 26, 1915.
3 SHEETS—SHEET 3.
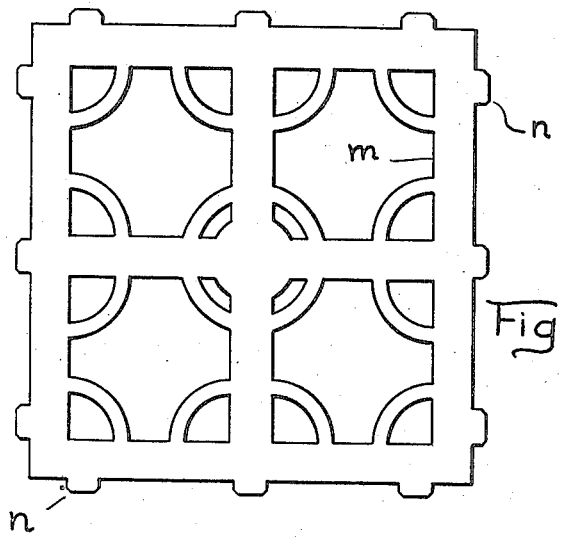
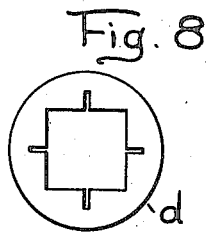
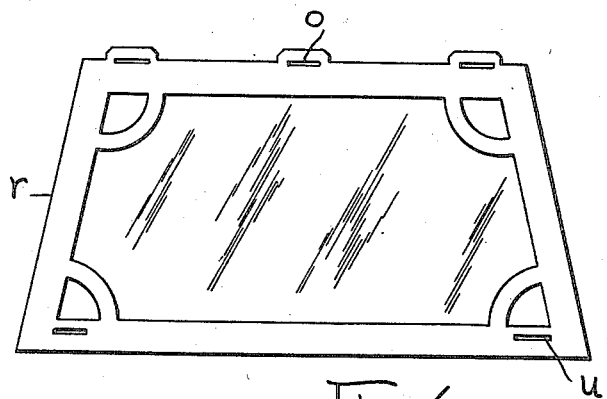
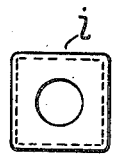
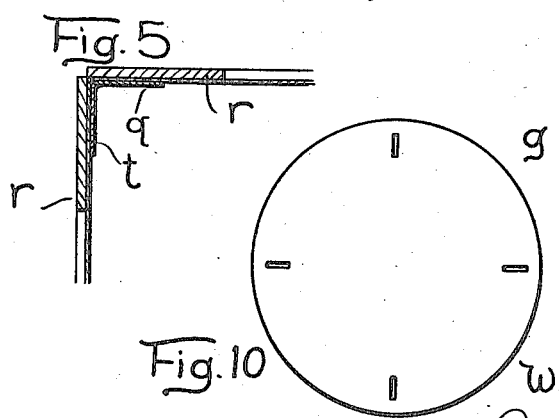
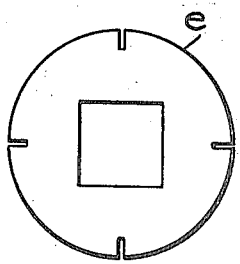
INVENTOR
William P. Stephenson
BY
Raymond A. Parker
ATTORNEY

UNITED STATES PATENT OFFICE.

WILLIAM P. STEPHENSON, OF WINDSOR, ONTARIO, CANADA.

KNOCKDOWN LAMP STAND AND SHADE.

1,157,732.　　　　　Specification of Letters Patent.　　Patented Oct. 26, 1915.

Application filed May 8, 1915.  Serial No. 26,706.

*To all whom it may concern:*

Be it known that I, WILLIAM P. STEPHENSON, a subject of the King of Great Britain, residing at Windsor, county of Essex, Province of Ontario, Canada, have invented a certain new and useful Improvement in Knockdown Lamp Stands and Shades, and declare the following to be a full, clear, and exact description of the same, such as will enable others skilled in the art to which it pertains to make and use the same, reference being had to the accompanying drawings, which form a part of this specification.

This invention relates to knock-down lamp-stands and shades.

It comprises an ornamental knock-down lamp-stand which can be made of sheet material and assembled without any fastening devices other than the sheet material parts of the stand. The parts of both the stand and the shade are so arranged as to come apart and form flat pieces with the exception of a small rectangular tube which forms the center of the stand. The parts may, therefore, be shipped in very small space and consequently at small expense. The chief idea is to make an ornamental lamp-stand and shade which can be made of paper-board and paper so that a very inexpensive article is produced.

In the drawings,—Figure 1 is a perspective of the stand and shade. Fig. 2 is a vertical section of the same. Fig. 3 is a plan view of the top of the shade. Fig. 4 is a view of one of the side portions of the shade. Fig. 5 is a view showing how the sides of the shade are hinged together in pairs. Fig. 6 is a top end view of the paper tube which forms the basis of the stand. Fig. 7 is a plan view of the cap that fits over this tube. Fig. 8 is a detail of the top ring which fits over the wings or the stays and tube to hold them to the central tube. Fig. 9 is a detailed view of the middle ring which fits over the central tube at the bottom and engages with the wings or stays to brace them. Fig. 10 is a view of the bottom disk which engages with projections on the stays or wings to brace them at the bottom. Fig. 11 is a detail of the corner pieces used to brace the shade. Fig. 12 is a detail view showing how the meeting ends of the two pairs of side pieces of the shade fit together.

My lamp-stand and shade is here shown in a form suitable for an electric light, but it is obvious that it could be used with other means for illumination with very slight changes within the skill of any mechanic. The idea is to make a knock-down light-stand which will be both strong and ornamental. To this end I provide a plurality of stays or wings $a$, preferably four in number. These stays may be cut to various ornamental shapes, one of which is shown in the drawings. Near the top they have projections $b$ which fit into slots in the central tube $c$ and are held in place in such slots when the top ring $d$ is slid on to its seat provided by the cut-away tops of the stays. In the form shown in the drawings the stays are provided with hooks which require a larger slot than the width of the throat of the hook, and after the head of the hook is shoved through the slot, the stay member is forced upward to bring the substance of the tube $c$ into the throat of the hook. This, however, is not absolutely essential as the stays will be held in place by simple projections. Similar hooks $b$ are shown on the stay members near the bottom of the tube. A middle ring $e$ can be fitted over the bottom of the central tube and is provided with slots to engage with the inside edges of the stays, both bracing and properly spacing them. Just above the feet of the stays and on the inside edge are located projections $f$ adapted to be interlocked by the disk $g$ provided with suitable slots to fit over these projections, the fit being sufficiently tight so the disk will not drop off from the projections. This securely ties the stays together at the bottom and hence the standard of the light is complete.

The incandescent light socket $h$ is provided with a suitable flange which fits over circumjacent material of the central aperture in the tube cap $i$. This, therefore, secures the incandescent light in position at the top of the tube $c$ when the cap is over the end of the tube. The wires for the socket extend down through the tube in the form of a flexible cord and out at the bottom. Resting on the top of the cap $i$ may be a ring $j$ carrying arms $k$ adapted to support the shade, which I will now describe.

The shade comprises an ornamental grille-work top piece $m$ provided on the edges with a plurality of projections or tongues $n$. These tongues are adapted to fit into the slots $o$ in the side pieces of the shade. The side pieces are hinged together in pairs, that is, there are two pairs of side pieces each joined by a flexible strip *q* (Fig. 5). The meeting ends of the two pairs of side pieces are provided with overhanging strips *t* as shown in Fig. 12, which serve to prevent the light from passing through the opening which would otherwise exist between the meeting ends. The side pieces are formed by a grille-work frame *r* which carries translucent paper which may be ornamentally colored if desired. Triangular corner pieces *s* are provided with suitable projections adapted to stay the corners of the side members at the bottom by the projections engaging through the slots *u* in the side pieces. The hooks in the ends of the shade-supporting arms *k* engage through perforations in the corner braces.

This lamp-stand and shade may be constructed entirely of paper-board and paper, or sheet metal and paper, or other similar materials. Hence it can be made very cheaply.

What I claim is:

1. A knock-down lamp-stand, having in combination, a central member provided with slots, a plurality of stays having projections engaging in slots of the central member, and means for locking over the stays and central member to hold the projections and slots in engagement.

2. A knock-down lamp-stand, having in combination, a central tube provided with slots, a plurality of stays or wings having projections fitting into the slots of the central tube, a member engaging over the tops of the stays and the central tube to hold them together, and a member engaging the bottom of the stays for tying them together.

3. A knock-down lamp, having in combination, a central tube provided with slots, stays provided with projections for engaging in the slots in the tube and projections near the bottom of the stays, a ring fitting over the central tube and the tops of the stays to tie them together at the top, and a member provided with slots fitting over the projections near the bottom of the stays to tie them together.

4. A knock-down lamp-stand, having in combination, a central tube provided with slots, stays having projections fitting into the slots and projections near the bottom of the stays, a ring adapted to fit over the top of the tube and the tops of the stays, a middle ring fitting over the bottom of the tube and provided with slots for engaging the inside edges of the stays, and a member provided with slots adapted to fit over projections near the bottom of the stays.

5. A knock-down lamp-stand, having in combination, a central tube, stays locking into the central tube, a lamp socket, a cap carrying the lamp socket and adapted to fit over the upper end of the central tube.

6. A knock-down lamp-shade, having in combination, a top member provided with projections or tongues, side members hinged together in pairs and provided with slots for detachably engaging the projections or tongues of the top member by friction between the tongues and walls of the slot alone.

7. A knock-down lamp-shade, having in combination, a top member, side members provided with slots in the lower corners, projections and slots in said top and side members for locking same together, and corner braces provided with projections to engage with slots at the bottom and the corners of the side members to lock them together at these points.

8. A knock-down lamp-stand, having in combination, a hollow central member provided with slots, a plurality of stays having hooks for engaging in the slots of the central member, the said slots being large enough to allow the passage of the head of the hook and the said stay being then adapted to be moved longitudinally of the central member, bringing the throat of the hook into engagement with the substance of the central member, and means for locking over the stays and central member for holding the hooks and slots in engagement.

In testimony whereof, I sign this specification.

WILLIAM P. STEPHENSON.